Aug. 2, 1966     W. C. MARTINSON     3,263,714
ANGLE SAW CUT GUIDE
Filed Oct. 8, 1963

INVENTOR.
WALTER C. MARTINSON
BY
Merchant, Merchant & Gould
ATTORNEYS

United States Patent Office 3,263,714
Patented August 2, 1966

3,263,714
ANGLE SAW CUT GUIDE
Walter C. Martinson, 410 N. Prairie, Sioux Falls, S. Dak.
Filed Oct. 8, 1963, Ser. No. 314,698
1 Claim. (Cl. 143—6)

My invention relates generally to saw guides, and more particularly to angle guides for power-driven rotary hand saws.

The primary object of my invention is the provision of an angle guide for hand-operated rotary power saws, particularly of the electric motor type, which may be efficiently used to accurately cut a given length of board at a desired angle.

A further object of my invention is the provision of a device of the class immediately above described which is extremely inexpensive to produce, simple in construction, and foolproof and accurate in its operation.

A further object of my invention is the provision of a device of the class above described which is extremely mobile and which may be operated with a minimum of skill.

A further object of my invention is the provision of a device of the class above described which may, with slight modification, be utilized to cut boards ranging considerably in their width dimensions.

The above and still further objects of my invention will become apparent from the following detailed specification, appended claim, and attached drawings.

Referring to the drawings wherein like characters indicate like parts throughout the several views.

Figure 1:
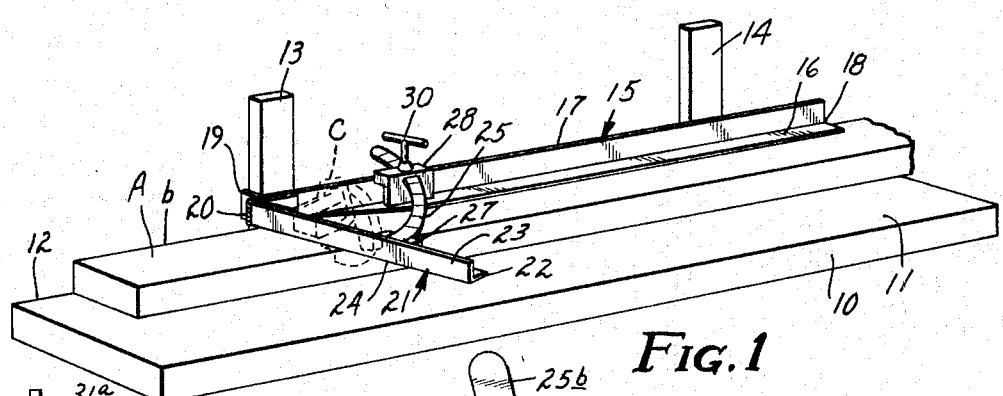
FIG. 1 is a view in perspective of my novel structure illustrating a conventional manner of use thereof on a work table.

Referring with greater particularity to the drawings, the numeral 10 indicates a work table having a horizontally disposed work surface 11. Secured to and upstanding from the rear longitudinal edge 12 of the work table 10 are longitudinally extended stop means in the form of separate upstanding stop legs 13, 14. Stop legs 13, 14 serve the primary purpose of aligning a work piece A on the work surface 11 of the work table 10 along the rear longitudinal edge 12 thereof.

My novel angle guide comprises an elongated body, identified in its entirety by 15, and including a horizontally disposed elongated strip-like base 16 having an integral flange 17 projecting upwardly therefrom at right angles along a rear longitudinal edge 18. The flange 17 is adapted to engage the stop legs 13, 14 to assure alignment of the body 15 with the work piece A upon which it is slidably mounted.

Adjacent one end the flange portion 17 of body 15 is provided with a laterally outwardly projecting stop lug 19. In closely spaced relation to the stop lug 19, the body 15 has pivotally secured thereto on a vertical axis 20 an arm 21.

Arm 21 comprises a horizontally disposed base portion 22 adapted to slidably overlie the work piece A in coplanar relationship with the base 16 of the body 15, and a vertically disposed guide-acting flange portion 23 which projects upwardly from the outer longitudinal edge 24 thereof. To facilitate maximum swinging movements of the arm 21 in the direction of body portion 15 the opposed coplanar base portions 22, 16, respectively, thereof are tapered as at 22a and 16a.

Figures 2, 3, 4, 5, 6:
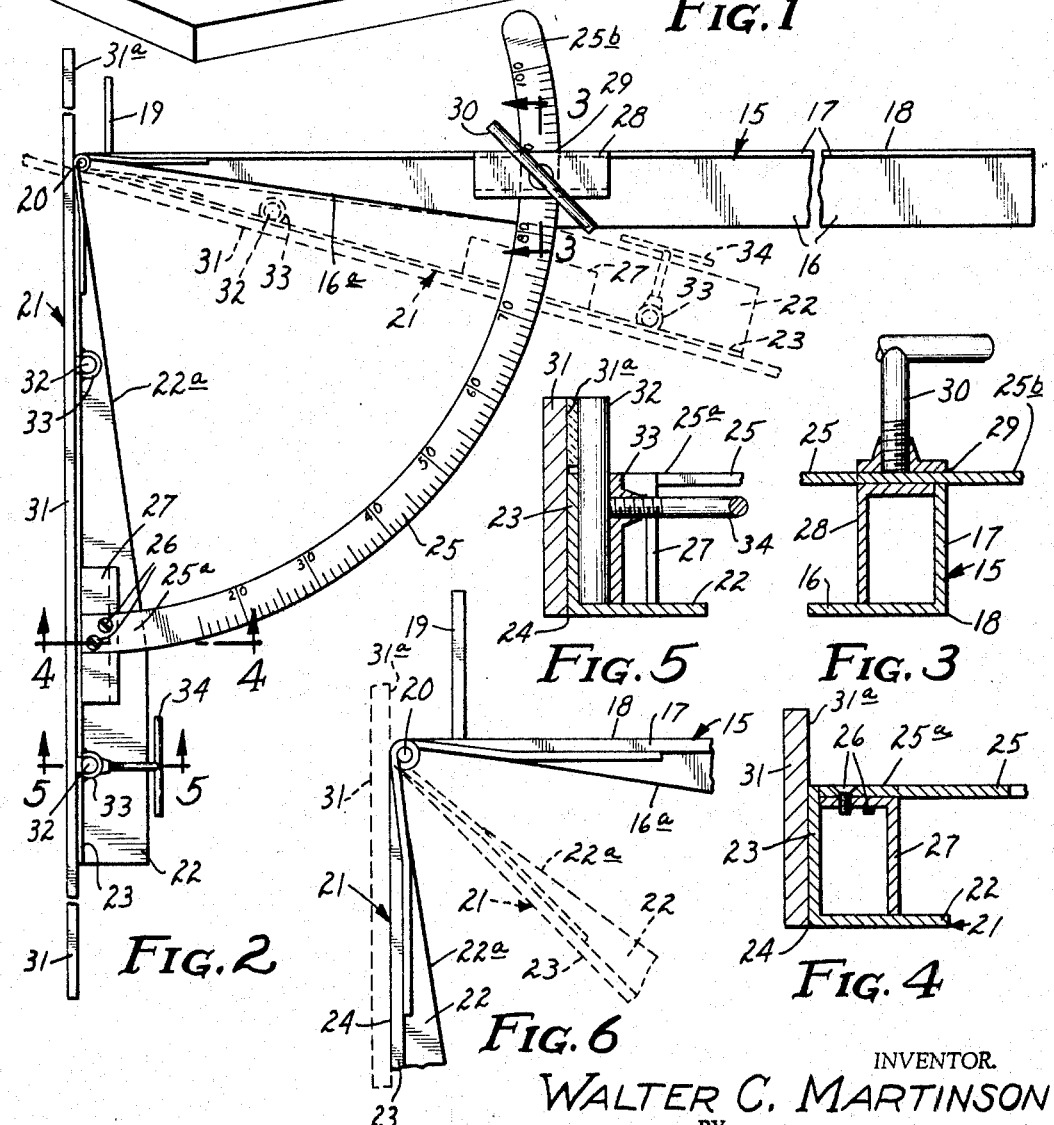
FIG. 2 is an enlarged view in top plan of my novel angle guide, some parts being broken away.
FIG. 3 is an enlarged view in vertical section as seen from the line 3—3 of FIG. 2.
FIG. 4 is an enlarged view in vertical section as seen from the line 4—4 of FIG. 2.
FIG. 5 is a view in vertical section as seen from the line 5—5 of FIG. 2 on an enlarged scale.
FIG. 6 is an enlarged fragmentary view in plan of the hinge portion of FIG. 2.

A graduated segment 25 of slightly more than 90 degrees of circular arc has its outer end 25a rigidly secured to the arm 21 in spaced relation to the pivotal connection 20, preferably through the medium of screws 26 having threaded engagement with a bracket member 27, as shown particularly in FIGS. 2 and 4. The inner end 25b of the segment 25 passes through bracket means 28 on the body 15, as indicated at 29, as shown particularly in FIGS. 2 and 3, and has sliding engagement therewith for suitable angular adjustments of the arm 21 with respect to the body 15 about the axis 20. For the purpose of securely locking the arm 21 and segment 25 in a desired angular adjusted relationship with respect to said body 15, I provide a handle-equipped-set-screw 30 carried by and having screw-threaded engagement with the bracket 28.

When it is desired to put my novel angle guide, above described, to use, the work piece A is first positioned on the work table 10 with the rear longitudinal edge b in engagement with the stop legs 13, 14. Thereafter, my novel angle guide is placed over the work piece A with the flange 17 of the base 15 also in engagement with the legs 13, 14, and with the stop lug 19 in engagement with the leg 13, so as to limit movement of said angle guide in a direction from left to right. Finally, the proper angular adjustment is imparted to the arm 21 so as to position the guide-acting flange 23 thereof precisely along the desired angle at which the work piece A is to be cut. After tightening movements are imparted to the set-screw 30, the rotary hand-saw C, illustrated generally by dotted lines in FIG. 1, is guided across the work piece A while in engagement with the guide-acting flange 23.

Under conditions where the work piece A on either or both sides of the stop leg 13 is of greater transverse dimension than the longitudinal dimensions of the arm 21, said arm 21 may be effectively extended through the medium of a supplemental guide-bar 31.

As shown particularly in FIGS. 2 and 5, the guide-bar 31, intermediate its ends, has secured to its inner face 31a, a pair of longitudinal spaced depending fingers 32 which are adapted to be slidably received in upwardly opening sockets 33 formed in the arm 21, immediately rearwardly of the guide-acting flange 23 thereof.

For the purpose of locking the guide-bar 31 to the arm 21, I provide a set-screw 34 located in the outermost socket 33.

My invention has been thoroughly tested and found to be entirely satisfactory for the accomplishment of the above objects; and while I have disclosed a preferred embodiment thereof, my invention may be capable of modification without departure from the scope and spirit of the appended claim.

What is claimed is:

An angle guide for power-driven rotary handsaws designed for use on a horizontally disposed work table having upstanding stop means adjacent its rear longitudinal edge, said guide comprising:
 (a) an elongated body including
  (1) a horizontally disposed base adapted to slidably overlie a workpiece resting upon said work table, and
  (2) an integral flange projecting upwardly from said base at right angles thereto for engagement with the stop means of a work table,
 (b) an arm pivotally secured to one end of said body for swinging movements about a vertical axis towards and away from said body over the surface of said workpiece, said arm comprising (1) a horizontally disposed base portion in a common plane with said base of said body and
(2) a vertically disposed guide-acting flange portion projecting upwardly from the outer longitudinal edge thereof,
(c) a horizontally disposed graduated segment carried by said arm in spaced relation to its pivotal connection to said body,
(d) the free end of said segment passing through an opening in the flange of said body, whereby to measure the angular relationship between the guide-acting flange of said arm and the flange of said body,
(e) means for locking said segment to said body at a given angular relationship of said arm with respect to said body, and
(f) means carried by the flange portion of said body and engageable with said stop means associated with said work table, limiting longitudinal movements of said body in one direction,
(g) the opposed side edges of the base portions of said body and said arm being tapered from said segment to the pivotal connections therebetween so as to facilitate maximum angular movements of said arm in the direction of said body.

References Cited by the Examiner
UNITED STATES PATENTS

| | | | |
|---|---|---|---|
| 622,190 | 3/1899 | Seavey | 143—89 |
| 1,700,189 | 1/1929 | Wikstrom | 143—89 X |
| 1,911,045 | 5/1933 | Tinnen | 143—6 |
| 2,651,333 | 9/1953 | Spinney | 143—6 |
| 2,748,812 | 6/1956 | Nelson | 143—174 X |
| 2,926,706 | 3/1960 | Hopla | 143—6 |

DONALD R. SCHRAN, *Primary Examiner.*